(12) United States Patent
Ohta

(10) Patent No.: US 11,207,921 B2
(45) Date of Patent: Dec. 28, 2021

(54) PNEUMATIC TIRE

(71) Applicant: Toyo Tire & Rubber Co., Ltd., Itami (JP)

(72) Inventor: Kazuki Ohta, Itami (JP)

(73) Assignee: TOYO TIRE CORPORATION, Itami (JP)

(*) Notice: Subject to any disclaimer, the term of this patent is extended or adjusted under 35 U.S.C. 154(b) by 417 days.

(21) Appl. No.: 16/188,700

(22) Filed: Nov. 13, 2018

(65) Prior Publication Data

US 2019/0160876 A1 May 30, 2019

(30) Foreign Application Priority Data

Nov. 27, 2017 (JP) .............................. JP2017-227114

(51) Int. Cl.
| | |
|---|---|
| *B60C 11/01* | (2006.01) |
| *B60C 11/03* | (2006.01) |
| *B60C 11/13* | (2006.01) |
| *B60C 11/12* | (2006.01) |

(52) U.S. Cl.
CPC ............ *B60C 11/01* (2013.01); *B60C 11/032* (2013.01); *B60C 11/0306* (2013.01); *B60C 11/1204* (2013.01); *B60C 11/13* (2013.01); *B60C 2011/013* (2013.01); *B60C 2011/0346* (2013.01); *B60C 2011/0348* (2013.01); *B60C 2011/0355* (2013.01); *B60C 2011/0393* (2013.01); *B60C 2011/0397* (2013.01); *B60C 2011/1209* (2013.01)

(58) Field of Classification Search
CPC ................................. B60C 11/01; B60C 11/13
See application file for complete search history.

(56) References Cited

U.S. PATENT DOCUMENTS

| | | | |
|---|---|---|---|
| 2003/0005992 A1* | 1/2003 | Radulescu | B60C 11/01 152/209.3 |
| 2005/0006016 A1* | 1/2005 | Ooyama | B60C 11/01 152/209.16 |
| 2013/0092302 A1* | 4/2013 | Okabe | B60C 11/0058 152/209.16 |
| 2019/0061430 A1* | 2/2019 | Kamigori | B60C 11/0318 |

FOREIGN PATENT DOCUMENTS

| | | |
|---|---|---|
| JP | 6-239109 A | 8/1994 |
| JP | 2009-143300 A | 7/2009 |

* cited by examiner

*Primary Examiner* — Timothy Kennedy
*Assistant Examiner* — Alexander A Wang
(74) *Attorney, Agent, or Firm* — Westerman, Hattori, Daniels & Adrian, LLP

(57) ABSTRACT

A shoulder land portion includes a main body land portion formed between a thin groove extending in a tire circumferential direction on a tire width direction inner side of a ground contact end and a shoulder main groove, and the main body land portion includes a contact region adjacent to the shoulder main groove provided along the tire circumferential direction and a non-contact region provided along the tire circumferential direction between the thin groove and the contact region. The contact region contacts a road surface in a normal load state, and the non-contact region is recessed to a tire radial direction inner side from a tread surface. The non-contact region does not contact the road surface in the normal road state, and when a length of the non-contact region is W1 and a length of the main body land portion both along the tire width direction is Rw, $0.2Rw \leq W1 \leq 0.5Rw$.

16 Claims, 3 Drawing Sheets

[Fig. 1]
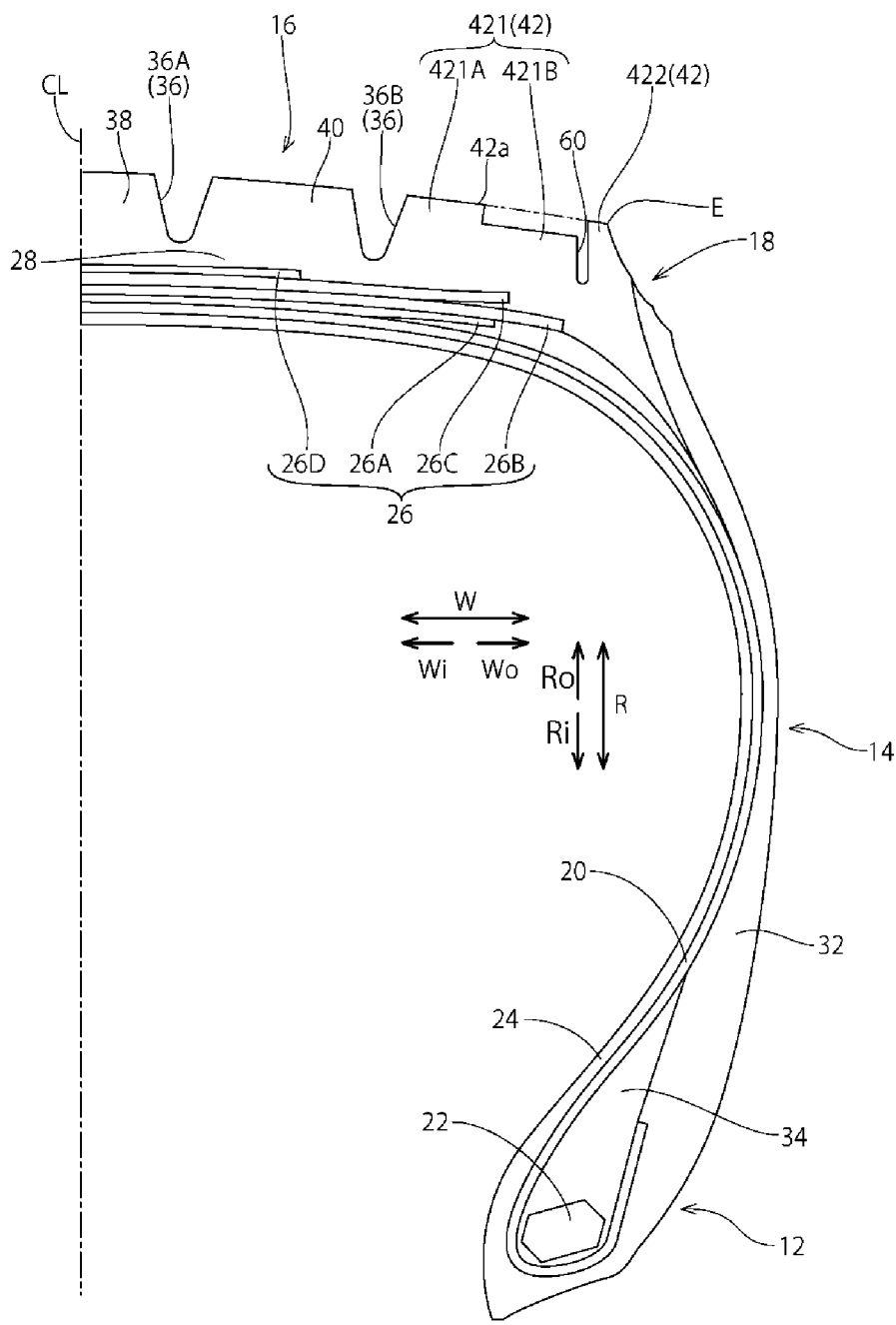

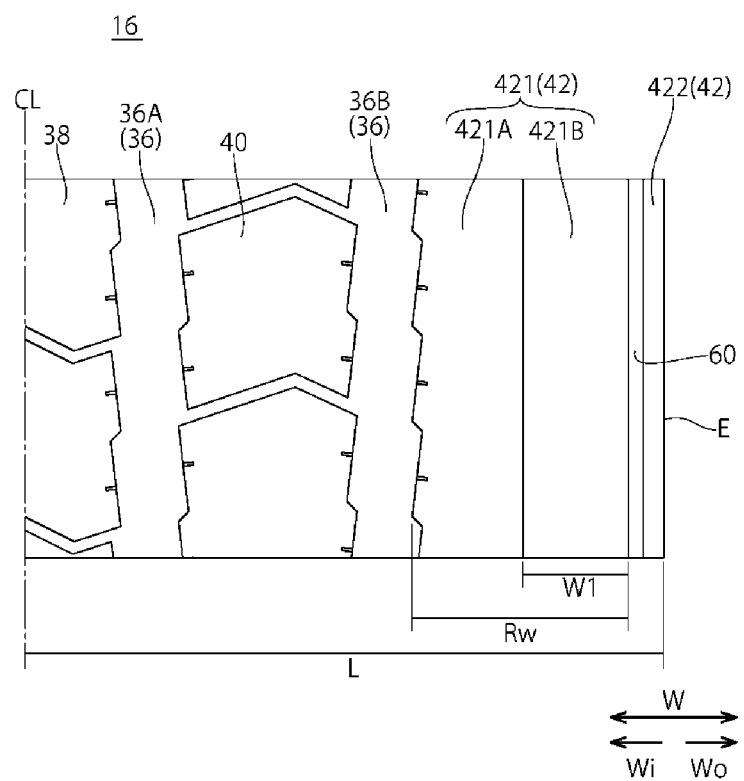

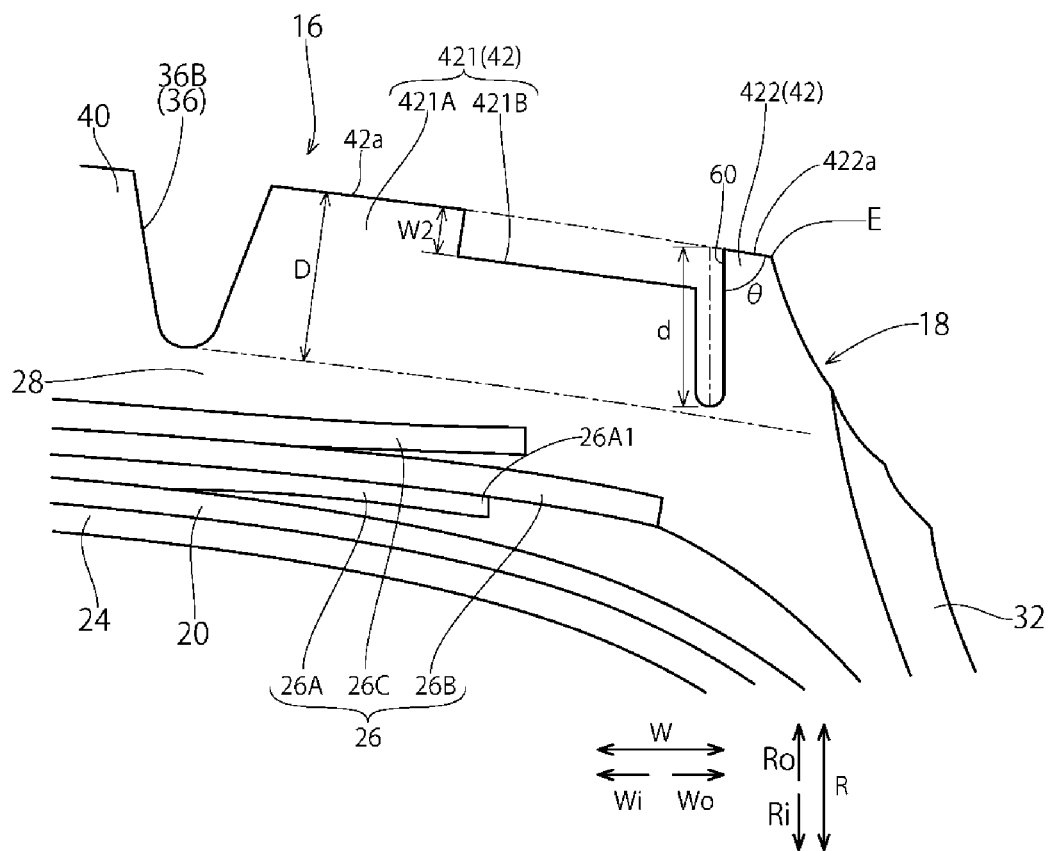
[Fig. 3]

PNEUMATIC TIRE

BACKGROUND OF THE INVENTION

1. Field of the Invention

The present invention relates to a pneumatic tire.

2. Description of Related Art

In a pneumatic tire, a ground contact pressure normally tends to be increased in the vicinity of a ground contact end at a shoulder land portion in a tread portion during travelling. As a result, uneven wear in which a wear amount in the vicinity of the ground contact end at the shoulder land portion is larger than other land portions in the tread portion may occur.

In JP-A-2009-143300 and JP-A-H6-239109, there are disclosed tires in which thin grooves extending in a tire circumferential direction are provided in the vicinity of the ground contact end at the shoulder land portion, thereby sectioning the shoulder land portion into a main body land portion on a tire width direction inner side and a sacrificial land portion on a tire width direction outer side to reduce the uneven wear at the main body land portion largely contributing to substantial tire performance.

However, even when the shoulder land portion is sectioned into the sacrificial land portion and the main body land portion by the thin grooves as in the above literatures, the ground contact pressure on the tire width direction outer side in the main body land portion becomes higher than that on the inner side, and uneven wear may occur in the main body land portion.

SUMMARY OF THE INVENTION

In view of the above, an object of the present invention is to provide a pneumatic tire capable of suppressing uneven wear occurring in the shoulder land portion.

A pneumatic tire according to the present invention includes a plurality of main grooves extending in a tire circumferential direction and a plurality of land portions sectioned by the main grooves on a tread portion, in which the main grooves include shoulder main grooves provided on a tire width direction outer side, the land portions include shoulder land portions formed on the tire width direction outer side of the shoulder main grooves, each of the shoulder land portions includes a thin groove extending in the tire circumferential direction on a tire width direction inner side of a ground contact end, a main body land portion formed between the thin groove and the shoulder main groove and a sacrificial land portion formed between the thin groove and the ground contact end, the main body land portion includes a contact region adjacent to the shoulder main groove provided along the tire circumferential direction and a non-contact region provided along the tire circumferential direction between the thin groove and the contact region, the contact region contacts a road surface in a normal load state where a pneumatic tire assembled to a normal rim and filled with a normal internal pressure is placed vertically on a flat road surface and a normal load is added, the non-contact region is recessed to a tire radial direction inner side from a tread surface so that a tire width direction outer side opens to the thin groove and does not contact the road surface in the normal load state, and when a length of the non-contact region along a tire width direction is W1 and a length of the main body land portion along the tire width direction is Rw, $0.2\text{Rw} \leq \text{W1} \leq 0.5\text{Rw}$.

BRIEF DESCRIPTION OF THE DRAWINGS

FIG. 1 is a half sectional view of a pneumatic tire according to a first embodiment of the present invention;

FIG. 2 is a plan view of a tread portion of the pneumatic tire of FIG. 1; and

FIG. 3 is an enlarged view of a relevant part of FIG. 1.

DESCRIPTION OF EMBODIMENTS

Hereinafter, an embodiment of the present invention will be explained with reference to the drawings.

In the specification, the ground contact end indicates an end portion of a tread surface in a tire width direction contacting a road surface in a normal load state where a pneumatic tire assembled to a normal rim and filled with a normal internal pressure is placed vertically on a flat road surface and a normal load is added. The normal rim is a rim defined by respective standards for each tire in a standard system including standards to which the tire is conformed. For example, the normal rim will be a standard rim in JATMA, "Design Rim" in TRA and "Measuring Rim" in ETRTO. The normal internal pressure is an air pressure defined by respective standards for each tire in the standard system including standards to which the tire is conformed. For example, the normal internal pressure will be the maximum air pressure in JATMA, the maximum value written in a table "TIRE LOAD LIMITS AT VARIOUS COLD INFLATION PRESSURES" in TRA, and "INFLATION PRESSURE" in ETRTO, however, 180 kPa when the tire is for a passenger car. The normal load is a load defined by respective standards for each tire in a standard system including standards to which the tire is conformed. For example, the normal load will be the maximum load ability in JTAMA, the maximum value written in the above table in TRA, and "LOAD CAPACITY" in ETRTO, however, a load corresponding to 88% of the load when the tire is for the passenger car.

The respective dimensions in the specification are in a normal state with no load in which the pneumatic tire is fitted to the normal rim and is filled with the normal internal pressure except for a case particularly mentioned.

FIG. 1 is a right-side half sectional view of a pneumatic tire 10 according to the embodiment taken along a meridian section including a tire axis. FIG. 2 is a plan view of a tread portion 16 showing a tread pattern of the pneumatic tire 10. As the pneumatic tire 10 is a symmetrical tire, a left side half is not shown.

The pneumatic tire 10 shown in FIG. 1 includes a right and left pair of bead portions 12, a right and left pair of side wall portions 14 extending from the bead portions 12 outwardly in a radial direction, a tread portion 16 forming a tread surface and a right and left pair of buttress portions 18 arranged on a tire radial direction inner side of the tread portion 16. Here, the buttress portion 18 is a boundary region between the tread portion 16 and the side wall portion 14, which is provided so as to connect the tread portion 16 to the side wall portion 14.

The pneumatic tire 10 includes a carcass ply 20 provided to be stretched between the pair of bead portions 12 in a toroidal shape. In the pair of bead portions 12, ring-shaped bead cores 22 are respectively embedded.

The carcass ply 20 extends from the tread portion 16 to the bead portion 12 through the buttress portion 18 and the side wall portion 14 and locked by the bead core 22 at the bead portion 12, which reinforce the respective portions 12, 14, 16 and 18. The carcass ply 20 is locked by folding peripheral portions of the bead cores 22 from the inner side to the outer side in a tire width direction at both end portions. An inner liner 24 for holding air pressure is arranged on an inner side of the carcass ply 20.

The carcass ply 20 is formed of at least one ply formed by arranging an organic fiber cord so as to be inclined at a given angle (for example, 70° to 90°) with respect to a tire circumferential direction and coated with topping rubber, and is formed by one ply in this example. As the cord for forming the carcass ply 20, for example, organic fiber cords made of polyester fiber, rayon fiber, aramid fiber, nylon fiber and the like are preferably used.

In the side wall portion 14, a side wall rubber 32 is provided on an outer side (namely, a tire outer surface side) of the carcass ply 20. In the bead portion 12, a bead filler 34 made of a hard rubber material extending toward a tire radial direction outer side in a tapered manner is arranged on an outer peripheral side of the bead core 22.

A belt 26 is arranged on the outer peripheral side of the carcass ply 20 in the tread portion 16. That is, the belt 26 is provided between the carcass ply 20 and a tread rubber 28 in the tread portion 16. The belt 26 is formed of plural pieces of cross belt plies arranged so that belt cords are inclined at a given angle (for example, 10° to 35°) with respect to the tire circumferential direction. As the belt cord, a steel cord or an organic fiber cord having a high tensile force may be used.

The belt 26 has a four-layer structure containing a first belt 26A positioned on the innermost side in a tire radial direction inner side Ri, and second belt 26B, a third belt 26C and a fourth belt 26D laminated in order on the outer peripheral side thereof.

On the surface of the tread portion 16, four main grooves 36 extending along the tire circumferential direction are provided. Specifically, the main grooves 36 include a pair of center main grooves 36A arranged on both sides with a tire equatorial plane CL interposed therebetween, and a pair of shoulder main groove 36B provided on a tire width direction outer side Wo of the pair of center main grooves 36A. The tire width direction outer side Wo indicates a side away from the tire equatorial plane CL in a tire width direction W.

Though a case where the main grooves 36 are provided while bending in zigzag in the tire circumferential direction is explained in the present embodiment, the main grooves 36 may extend in a straight line.

According to the above four main grooves 36, a central land portion 38 is formed between the two center main grooves 36A, intermediate land portions 40 are formed between the center main grooves 36A and the shoulder main grooves 36B and shoulder land portions 42 are formed on the tire width direction outer side Wo of the two shoulder main grooves 36B in the tread portion 16. The central land portion 38 and the intermediate land portions 40 are block lines separated in the tire circumferential direction by lateral grooves. The shoulder land portions 42 are formed by ribs continued in the tire circumferential direction.

An outer end in the tire width direction of a tread surface 42a in the shoulder land portion 42 forms a tread ground contact end E, to which the buttress portion 18 extending inwardly in a tire radial direction and forming an upper part of a tire side surface is connected.

Then, a thin groove 60, a main body land portion 421 and a sacrificial land portion 422 are provided in the shoulder land portion 42 respectively along the tire circumferential direction.

Specifically, the thin groove 60 is a concave groove recessed almost to the tire radial direction inner side Ri from the tread surface 42a so that a groove width is approximately constant. The thin groove 60 is provided in a tire width direction inner side Wi of the ground contact end E (namely, in the vicinity of the ground contact end E), sectioning the shoulder land portion 42 into the main body land portion 421 on the tire width direction inner side Wi and the sacrificial land portion 422 on the tire width direction outer side Wo. The thin groove 60 can be provided in the vicinity of the ground contact end E so as to be positioned at an area within 5% of a tread ground contact width (an interval between right and left ground contact ends E) L from the ground contact end E.

It is preferable that a groove depth "d" of the thin groove 60 is shallower than a groove depth D of the shoulder main groove 36B (namely, d<D). It is also preferable that an angle θ made by the thin groove 60 and a tread surface 422a of the sacrificial land portion 422 is an acute angle in a range of 75 degrees of more to 85 degrees or less. When the thin groove 60 is set in such angle, a depth direction of the thin groove 60 is approximately parallel to the tire radial direction, therefore, protrusions used for molding the thin grooves 60 are easily pulled out from the thin grooves 60 at the time of demolding of the tire formed by vulcanization molding to thereby suppress chipping to be generated around the thin grooves 60 at the time of demolding.

The main body land portion 421 provided on the tire width direction inner side Wi of the thin groove 60 includes a contact region 421A adjacent to the shoulder main groove 36B and a non-contact region 421B provided between the contact region 421A and the thin groove 60.

The contact region 421A is a region extending along a circumferential direction forming the tire width direction inner side Wi of the main body land portion 421, which is the region contacting the road surface in the normal load state where the pneumatic tire 10 assembled to the normal rim and filled with the normal internal pressure is placed vertically on a flat road surface and the normal load is added.

The non-contact region 421B are a region extending along a circumferential direction forming the tire width direction outer side Wo of the main body land portion 421. The non-contact region 421B is recessed to the tire radial direction inner side Ri from the tread surface 42a so that the tire width direction outer side Wo thereof opens to the thin groove 60, which is the region not contacting the road surface and separated from the road surface in the normal load state of a brand-new pneumatic tire 10.

A length W1 along the tire width direction W of the non-contact region 421B is set to 0.2 times or more to 0.5 times or less of a length Rw along the tire width direction W of the main body land portion 421 (namely, 0.2Rw≤W1≤0.5Rw).

When the shoulder main groove 36B bends in zigzag as in the present embodiment, the length Rw of the main body land portion 421 is a length in the tire width direction W from an innermost position of the tire width direction inner side Wi to the thin groove 60 in the main land portion 421.

Here, examples of dimensions of the thin groove 60, the contact region 421A and the non-contact region 421B are cited with reference to FIG. 2 and FIG. 3. The groove width D of the shoulder main groove 36B may be set to 10.0 to 15.0 mm, a tread ground contact width L may be set to 230 to 250 mm and the length Rw along the tire width direction W of the main body land portion 42 may be set to 16.0 to 100.0 mm, whereas, the groove width "d" of the thin groove 60 may be set to 12.0 to 15.0 mm, a width "c" of the thin groove 60 may be set to 2.0 to 2.5 mm, the length W1 along the tire width direction W of the non-contact region 421B is set to 8.0 to 20.0 mm and a depth W2 of the non-contact region 421 may be set to 2.0 to 4.0 mm.

As the thin groove 60 extending in the tire circumferential direction is provided on the tire width direction inner side Wi of the ground contact end E in the shoulder land portion 42 in the embodiment, the sacrificial land portion 422 is formed on the tire width direction outer side Wo of the shoulder land portion 42, and uneven wear of the main body land portion 421 largely contributing to the substantial tire performance can be reduced. Additionally, the non-contact region 421B not contacting the road surface in the normal load state is provided on the tire width direction outer side Wo in which the ground contact pressure tends to be increased in the main body land portion 421 in the present embodiment, therefore, the ground contact pressure of the main body land portion 421 becomes uniform and the uneven wear can be suppressed.

Also in the present embodiment, the length W1 along the tire width direction W of the non-contact region 421B is 0.2 times or more to 0.5 times or less of a length Rw along the tire width direction W of the main body land portion 421, therefore, a phenomenon in which the contact region 421A partially chips off, which is so-called rib-tearing can be suppressed while suppressing the uneven wear of the main body land portion 421. That is, the length W1 of the non-contact region 421B is larger than a length of 0.2 times of the length Rw of the main body land portion 421 in the present embodiment, therefore, the ground contact pressure in the tire width direction of the contact region 421A can be uniform and the uneven wear can be suppressed. Moreover, the length W1 of the non-contact region 421B is smaller than a length of 0.5 times of the length RW of the main body land portion 421, therefore, it is possible to prevent the contact region 421A from falling to the tire width direction outer side Wo as well as prevent the contact region 421A from partially chipping off.

It is preferable that the depth of the non-contact region 421B (a recessed amount of the non-contact region 421B) W2 is set to 0.2 times or more to 0.5 times or less of the depth D of the shoulder main groove 36B (namely, 0.2D≤W2≤0.5D). The depth W2 of the non-contact region 421B is preferably shallower than the depth "d" of the thin groove 60 (namely, W2<d). When the depth W2 of the non-contact region 421B is set as described above, the non-contact region 421B suppresses falling of the contact region 421A to the tire width direction outer side Wo and can suppress the rib tearing in which the contact region 421A partially chips off while securing a clearance with respect to the road surface in the normal load state.

Also in the present embodiment, it is preferable that the non-contact region 421B is provided from a position of the tire width direction outer side Wo of the first belt 26A to a position on the tire width direction inner side Wi of a tire width direction outer end 26A1 of the first belt 26A so as to overlap with the tire width direction outer end 26A1 of the first belt 26A in the tire width direction W.

Also in the embodiment, a surface of the non-contact region 421B facing the tire diameter direction outer side Ro may be a surface parallel to the tread surface 42a as shown in FIG. 1 and FIG. 3, or may be an inclined surface inclined to be deeper toward the tire width direction outer side Wo or may be a stepped surface becoming deeper in stages toward the tire width direction outer side Wo.

The above embodiment is cited as an example and does not intend to limit the scope of the invention. The novel embodiment may be achieved in other various manners, and various kinds of omission, replacement and alterations may occur within a scope not departing from the gist of the invention.

EXAMPLES

Hereinafter, the present invention will be explained further specifically by examples, and the present invention is not limited by these examples.

Pneumatic tires of Examples 1 to 3 and Comparative Examples 1 to 3 (tire size: 295/75R22.5) were experimentally produced. These prototype tires were fabricated by setting the tire internal structure and the basic tread pattern to the same and by changing the length W1 in the tire width direction W of the non-contact region 421B provided in the shoulder land portion 42.

Specifically, the pneumatic tire in Comparative Example 1 is a pneumatic tire in which only the thin groove 60 is provided in the shoulder land portion 42 and the non-contact region 421B does not exist. The pneumatic tires in Examples 1 to 3, Comparative Examples 2 and 3 are pneumatic tires each provided with the thin groove 60 and the non-contact region 421B. The lengths W1 in the tire width direction W of the non-contact regions 421B in respective tires are as shown in Table 1 below. The lengths Rw in the tire width direction W of the main body land portions 421 in the pneumatic tires in Examples 1 to 3, Comparative Examples 2 and 3 are all 39.5 mm.

The pneumatic tires in Examples 1 to 3 and Comparative Examples 1 to 3 assembled to a rim of 8.25×7.50 and filled with air until an internal pressure became 760 kPa were assembled to a front shaft of a dual-drive tractor head car. After traveling on open roads and expressways at a ratio of 2:1 for a total distance of 10000 km, evaluations were conducted for respective tires.

(1) Rib-Tearing Resistance

In chips of the contact region 421A generated in tires after travelling, a size of a chip in which a product of a length and a width was largest was set as a rib-tearing value of each tire, and respective examples and comparative examples were indexed by using the rib-tearing value of Comparative Example 1 as 100. The smaller the index is, the more excellent the rib-tearing resistance is, in which the contact region in the shoulder land portion does not chip off easily.

(2) Uneven Wear Resistance

In uneven wear generated in the shoulder land portions of the tires after traveling, an amount of uneven wear having the largest product of a width and a depth was set as a wear value, and respective examples and comparative examples were indexed by using a wear amount of Comparative Example 1 as 100. The smaller the index is, the smaller the uneven wear is and the more excellent the uneven wear resistance is.

TABLE 1

| | Comparative Example 1 | Comparative Example 2 | Comparative Example 3 | Example 1 | Example 2 | Example 3 |
|---|---|---|---|---|---|---|
| Rw (mm) | 39.5 | 39.5 | 39.5 | 39.5 | 39.5 | 39.5 |
| W1 (mm) | 0 | 4.0 | 23.7 | 13.8 | 19.8 | 7.9 |
| W1/Rw | 0 | 0.1 | 0.6 | 0.35 | 0.5 | 0.2 |
| Uneven wear resistance | 100 | 100 | 97 | 92 | 90 | 98 |
| Rib-tearing resistance | 100 | 99 | 110 | 102 | 105 | 101 |

Results are as shown in Table 1. In Examples 1 to 3, the uneven wear resistance in the shoulder land portion was improved while suppressing deterioration of rib-tearing resistance by providing the non-contact region 421B in the main body land portion 421. On the other hand, in Comparative Example 2 (W1/Rw=0.1), there was little improvement in uneven wear resistance. In Comparative Example 3 (W1/Rw=0.6), the contact region 421A easily chipped off and the rib-tearing resistance was deteriorated.

What is claimed is:

1. A pneumatic tire comprising:
a plurality of main grooves extending in a tire circumferential direction; and
a plurality of land portions sectioned by the main grooves on a tread portion, wherein
the main grooves include a shoulder main groove provided on a tire width direction outer side,
the land portions include shoulder land portions formed on the tire width direction outer side of the shoulder main groove,
each of the shoulder land portions includes a thin groove extending in the tire circumferential direction on a tire width direction inner side of a ground contact end, a main body land portion between the thin groove and the shoulder main groove, and a sacrificial land portion between the thin groove and the ground contact end,
the main body land portion includes a contact region adjacent to the shoulder main groove provided along the tire circumferential direction and a non-contact region provided along the tire circumferential direction between the thin groove and the contact region,
the contact region contacts a road surface in a normal load state where a pneumatic tire assembled to a normal rim and filled with a normal internal pressure is placed vertically on a flat road surface and a normal load is added,
the non-contact region is recessed to a tire radial direction inner side from a tread surface with an air gap separating the non-contact region and the tread surface and a tire width direction outer side of the non-contact region opening to the thin groove, the non-contact region not contacting the road surface in the normal load state,
with a length of the non-contact region along a tire width direction being W1 and a length of the main body land portion along the tire width direction being Rw, $0.2Rw \leq W1 \leq 0.5Rw$, and
with a depth of the non-contact region being W2, and a groove depth of the shoulder main groove being D, $0.2D \leq W2 \leq 0.25D$.

2. The pneumatic tire according to claim 1,
wherein the tread portion includes a plurality of belts, with at least one of the belts having a maximum width in the tire width direction, and
the non-contact region is arranged so as to overlap with a tire width direction outer end of the at least one of the belts in the tire width direction.

3. The pneumatic tire according to claim 2,
wherein the tread portion includes a plurality of belts stacked in a tire radial direction, and
the non-contact region is arranged so as to overlap with the tire width direction outer end of a belt positioned on the inner most side of the tire radial direction in the tire width direction.

4. The pneumatic tire according to claim 1,
wherein the non-contact region has a surface parallel to the tread surface.

5. The pneumatic tire according to claim 1,
wherein the thin groove is provided at an area within 5% of a tread ground contact width from the ground contact end.

6. The pneumatic tire according to claim 1,
wherein the groove depth of the thin groove is shallower than the groove depth of the shoulder main groove.

7. The pneumatic tire according to claim 1,
wherein an angle θ made by the thin groove and a tread surface of the sacrificial land portion is an acute angle.

8. The pneumatic tire according to claim 7,
wherein the angle θ is 75 degrees or more to 85 degrees or less.

9. A pneumatic tire comprising:
a plurality of main grooves extending in a tire circumferential direction; and
a plurality of land portions sectioned by the main grooves on a tread portion, wherein
the main grooves include a shoulder main groove provided on a tire width direction outer side,
the land portions include shoulder land portions formed on the tire width direction outer side of the shoulder main groove,
each of the shoulder land portions includes a thin groove extending in the tire circumferential direction on a tire width direction inner side of a ground contact end, a main body land portion between the thin groove and the shoulder main groove, and a sacrificial land portion between the thin groove and the ground contact end,
the main body land portion includes a contact region adjacent to the shoulder main groove provided along the tire circumferential direction and a non-contact region provided along the tire circumferential direction between the thin groove and the contact region,
the contact region contacts a road surface in a normal load state where a pneumatic tire assembled to a normal rim and filled with a normal internal pressure is placed vertically on a flat road surface and a normal load is added,
the non-contact region is recessed to a tire radial direction inner side from a tread surface with an air gap separating the non-contact region and the tread surface and a tire width direction outer side of the non-contact region opening to the thin groove, the non-contact region not contacting the road surface in the normal load state, with a length of the non-contact region along a tire width direction being W1 and a length of the main body land portion along the tire width direction being Rw, 0.2Rw≤W1≤0.5Rw, and the depth of the non-contact region is shallower than a groove depth of the thin groove.

10. The pneumatic tire according to claim 9, wherein the tread portion includes a plurality of belts, with at least one of the belts having a maximum width in the tire width direction, and
the non-contact region is arranged so as to overlap with a tire width direction outer end of the at least one of the belts in the tire width direction.

11. The pneumatic tire according to claim 10, wherein the tread portion includes a plurality of belts stacked in a tire radial direction, and
the non-contact region is arranged so as to overlap with the tire width direction outer end of a belt positioned on the inner most side of the tire radial direction in the tire width direction.

12. The pneumatic tire according to claim 9, wherein the non-contact region has a surface parallel to the tread surface.

13. The pneumatic tire according to claim 9, wherein the thin groove is provided at an area within 5% of a tread ground contact width from the ground contact end.

14. The pneumatic tire according to claim 9, wherein the groove depth of the thin groove is shallower than the groove depth of the shoulder main groove.

15. The pneumatic tire according to claim 9, wherein an angle θ made by the thin groove and a tread surface of the sacrificial land portion is an acute angle.

16. The pneumatic tire according to claim 15, wherein the angle θ is 75 degrees or more to 85 degrees or less.

* * * * *